JOHN P. WHIPPLE, OF WOONSOCKET, RHODE ISLAND.

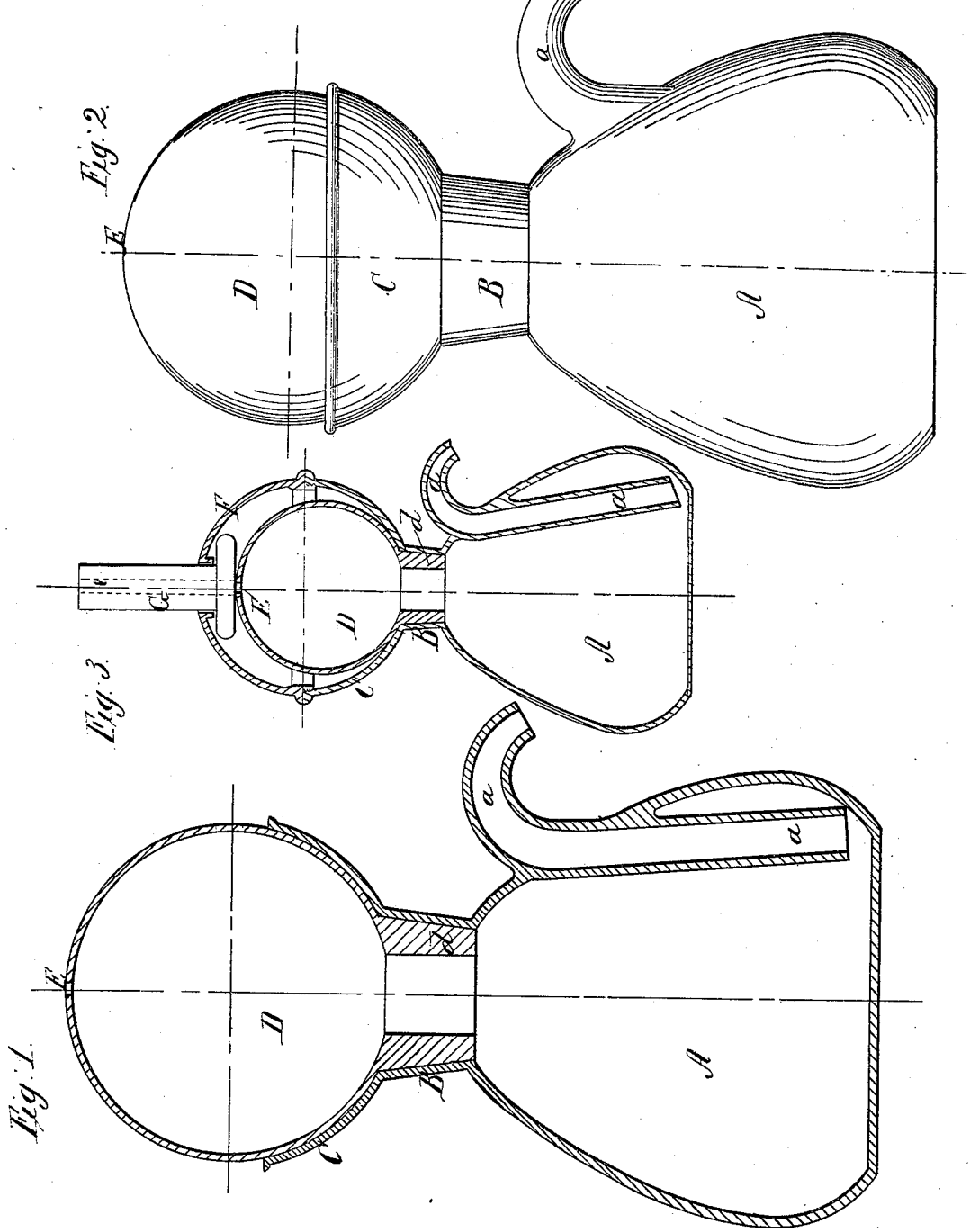

Letters Patent No. 88,999, dated April 13, 1869.

IMPROVED SIRUP-PITCHER.

The Schedule referred to in these Letters Patent and making part of the same.

*To all whom it may concern:*

Be it known that I, JOHN P. WHIPPLE, of Woonsocket, in the county of Providence, and in the State of Rhode Island, have invented a new and useful Improvement in Sirup-Pitchers; and I do hereby declare that the following is a full, clear, and exact description thereof, reference being had to the accompanying drawings, and to the letters of reference marked thereon.

The nature of my invention consists in providing a sirup-pot, in the main body of which is a spout, extending from near the bottom upward, and passing out a short distance below the neck.

On the neck of the pot is a cup-shaped head, on which rests a hollow elastic sphere or bellows, with a hollow neck, fitting closely into the neck of the pot, and serving as the stopper.

The bellows may be made of any elastic material impervious to air.

To enable others skilled in the art to make and use my invention, I will proceed to describe its construction and operation.

In Figure 1, A represents the main body of the pot, and *a*, the spout.

B, the neck.

C, the cup-shaped head.

D, the elastic bellows, with the hollow neck *d*, fitting, as the stopper, into the neck B of the pot.

In the top of the bellows D is a small hole, or vent, E, serving as a safety-valve.

Figure 3 shows a modification of the construction of the pot.

On the cup-shaped head C, is screwed a cap, F, with a hole in the centre, through which passes a plunger, G, with a hole, *e*, running through it. The plunger rests on the bellows.

Its operation is as follows:

The stopper is withdrawn, and the main body filled with sirup through the funnel-shaped head and neck.

The stopper having again been inserted, the neck of the pot is taken between the fingers, with the thumb resting on the top of the bellows and closing the vent.

When constructed as shown in the modification, the thumb rests on the plunger. A slight pressure of the thumb, forcing the air into the main body of the pot, displaces and forces out of the spout a portion of the contents. Then releasing the pressure, the bellows regains its normal shape, the air required passing in through the spout, forcing the sirup in it down, by which dripping is prevented.

By repeating the process, all the contents can be forced out.

After bringing the pot from a cold room into a warmer one, the sirup is liable to run over through the spout, as the air expands and presses on it.

To prevent this, and to allow the escape of air from the bellows, a small vent is made in its top, and in the plunger, when that is used as shown in the modification.

A cap over the end of the spout, keeps ants and other insects out.

By making the pot of glass, or lining it with non-corrosive material, it may be used for catsup, &c.

What I claim as my invention, and desire to secure by Letters Patent, is—

A sirup-pot, constructed with a cup-shaped head, C, and neck B, and the hollow elastic sphere, or bellows D, with the stopper *d* and the vent E, substantially as described.

The above specification signed by me, this 10th day of March, 1869.

JOHN P. WHIPPLE.

Witnesses:
WM. H. BAILEY,
J. R. BAILEY.